US012470878B2

(12) United States Patent
Jinde et al.

(10) Patent No.: US 12,470,878 B2
(45) Date of Patent: Nov. 11, 2025

(54) SOUND PROCESSING APPARATUS, SOUND PROCESSING APPARATUS MAIN BODY AND HOLDER

(71) Applicant: CASIO COMPUTER CO., LTD., Tokyo (JP)

(72) Inventors: Masaru Jinde, Tokyo (JP); Akira Inoue, Tokyo (JP); Chihiro Suzuki, Tokyo (JP); Shinobu Sugioka, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 118 days.

(21) Appl. No.: 18/517,412

(22) Filed: Nov. 22, 2023

(65) Prior Publication Data

US 2024/0179477 A1 May 30, 2024

(30) Foreign Application Priority Data

Nov. 25, 2022 (JP) ................................ 2022-188075

(51) Int. Cl.
*H04R 25/02* (2006.01)
*H04R 25/00* (2006.01)

(52) U.S. Cl.
CPC .......... *H04R 25/02* (2013.01); *H04R 25/604* (2013.01)

(58) Field of Classification Search
CPC ...... H04R 1/105; H04R 25/02; H04R 1/1016; H04R 25/604; H04R 25/606
USPC .......................................................... 381/312
See application file for complete search history.

(56) References Cited

U.S. PATENT DOCUMENTS

2023/0292033 A1* 9/2023 Kucharko ............ H04R 1/1016

FOREIGN PATENT DOCUMENTS

| | | | |
|---|---|---|---|
| CN | 210807614 | U | 6/2020 |
| JP | H2-62199 | A | 3/1990 |
| JP | 2013-115800 | A | 6/2013 |
| JP | 3211781 | U | 8/2017 |
| JP | 2018082324 | A | 5/2018 |
| JP | 2019-125904 | A | 7/2019 |
| JP | 2019-193000 | A | 10/2019 |

OTHER PUBLICATIONS

JPO; Application No. 2022-188075; Notice of Reasons for Refusal dated Oct. 8, 2024.
JPO; Application No. 2025-023890; Notice of Reasons for Refusal dated Sep. 9, 2025.

* cited by examiner

*Primary Examiner* — Paul Kim
(74) *Attorney, Agent, or Firm* — Fitch, Even, Tabin & Flannery LLP

(57) ABSTRACT

A sound processing apparatus includes: a main body in which one side surface comes into contact with an ear when worn; and a holder which is detachable from the main body, wherein, the main body is provided with a stepped portion on an outer peripheral edge of an other side surface different from the one side surface in contact with the ear, and the holder includes a fitting portion fitted in the stepped portion and an attaching portion attached to the ear.

15 Claims, 7 Drawing Sheets

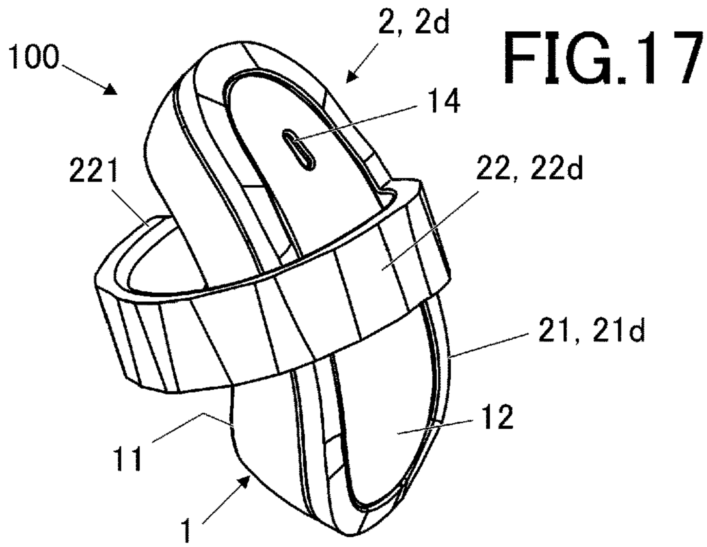
FIG.17
FIG.18A
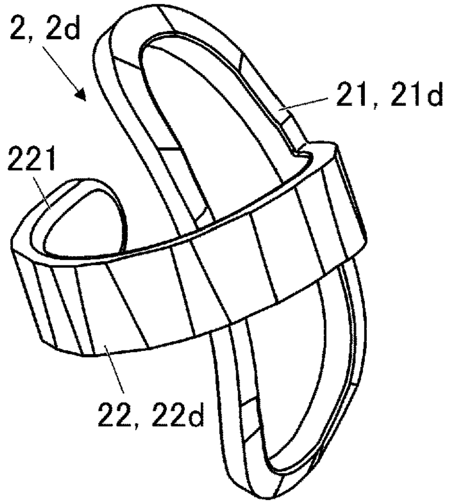
FIG.18B
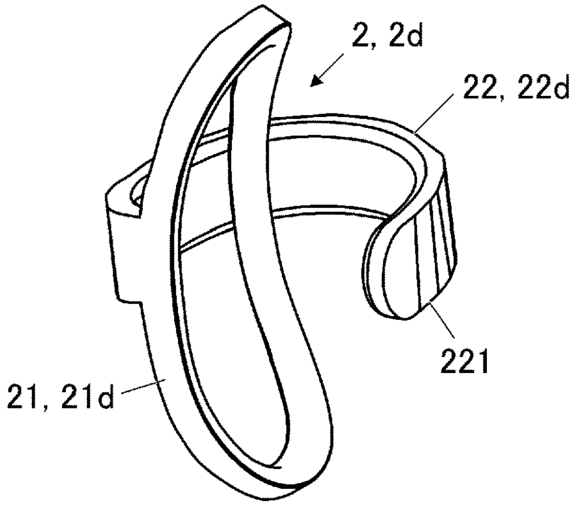
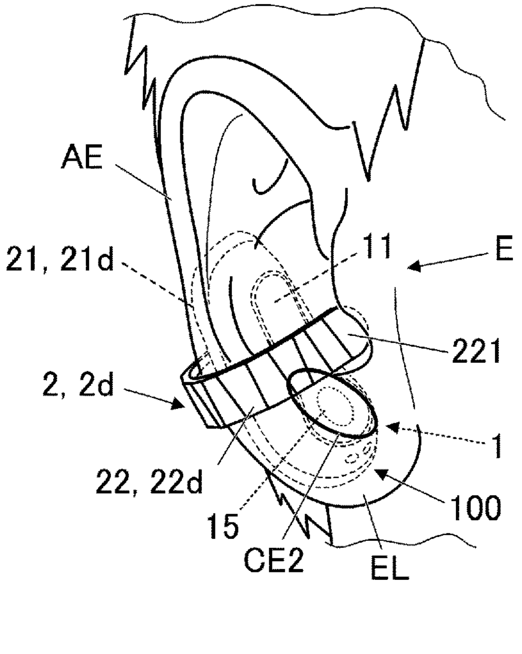
FIG.19

SOUND PROCESSING APPARATUS, SOUND PROCESSING APPARATUS MAIN BODY AND HOLDER

REFERENCE TO RELATED APPLICATIONS

This application claims the benefit of Japanese Patent Application No. 2022-188075, filed Nov. 25, 2022 which is hereby incorporated by reference herein in its entirety.

FIELD

The present disclosure relates to a sound processing apparatus, a sound processing main body, and a holder.

BACKGROUND

Conventionally, there has been a hearing aid that transmits bone-conducted sound to a head from a hearing aid main body that is worn between an auricle and the head and that provides the sound to the user (for example, an ear-hung hearing aid disclosed in JP 2013-115800).

As described above, in a case in which the hearing aid is worn between the auricle and the head, the worn hearing aid is less conspicuous and can be used with relatively little resistance.

SUMMARY

One aspect of the sound processing apparatus of the present disclosure includes, a main body in which one side surface comes into contact with an ear when worn; and a holder which is detachable from the main body, wherein, the main body is provided with a stepped portion on an outer peripheral edge of an other side surface different from the one side surface in contact with the ear, and the holder includes a fitting portion fitted in the stepped portion and an attaching portion attached to the ear.

BRIEF DESCRIPTION OF DRAWINGS

The present disclosure will be more understood with reference to the following detailed descriptions with the accompanying drawings.

FIG. 14A is the hearing aid for the left ear, and FIG. 14B is the hearing aid for the right ear.

FIG. 15A is a diagram showing a state in which only the holder is detached from the state shown in FIG. 14A, and FIG. 15B is a diagram showing the holder shown in FIG. 15A in a direction in which an attaching portion is positioned to the closer area.

FIG. 17 is a perspective view of essential parts of the hearing aid in which a fourth holder is attached to the main body as viewed from the outside.

FIG. 18A and FIG. 18B are perspective views of the essential parts of the fourth holder, specifically, FIG. 18A is a diagram showing a state in which only the holder is detached from the state shown in FIG. 17, and FIG. 18B is a diagram viewing from the inside the state of attachment of the holder shown in FIG. 18A attached to the main body.

FIG. 19 is a diagram showing a state in which the hearing aid with the fourth holder attached to the main body is worn on the ear.

DETAILED DESCRIPTION

According to the present embodiment, a hearing aid is described as one example but the present invention can be applied to ear devices such as collectors, sound processing apparatuses and earphones.

The hearing aid (sound processing apparatus) is used daily and can be used in various situations.

Therefore, if hearing aids can be used according to the situation as if they were accessories, it is possible to positively enjoy wearing the hearing aid. This leads to actively encouraging the user to go out wearing the hearing aid in various situations.

The present disclosure is disclosed in view of the above situation and it is possible to change an outer appearance of the sound processing apparatus according to purpose of use, situation, etc.

With reference to FIG. 1 to FIG. 19, an embodiment of the hearing aid (sound processing apparatus) according to the present disclosure is described.

Various limitations that are technically preferable to implement the present disclosure are added to the embodiments described below. However, the scope of the present disclosure is not limited to the embodiments and the illustrated examples described below.

Figure 1:
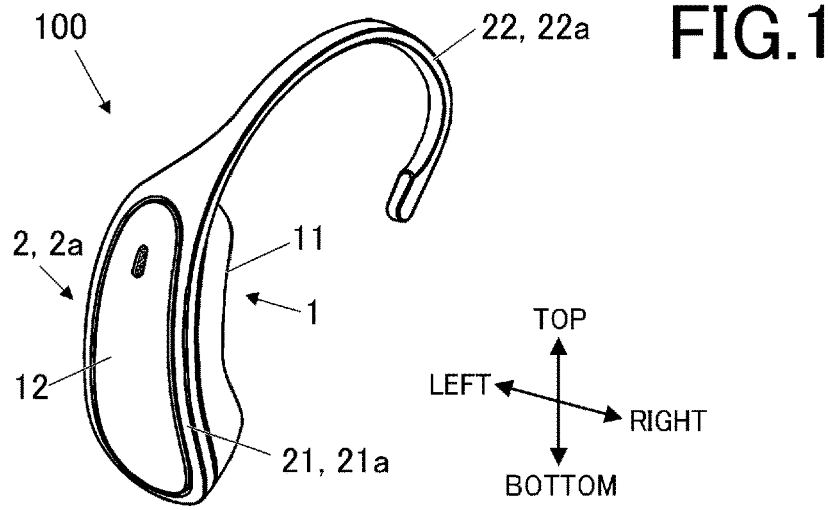
FIG. 1 is a perspective view of essential parts of a hearing aid in which a first holder is attached to a main body as viewed from the outside.
Figure 2:
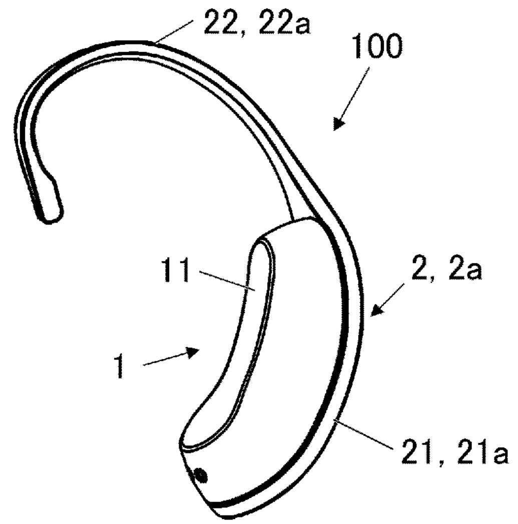
FIG. 2 is a perspective view of essential parts of the hearing aid shown in FIG. 1 as viewed from the inside.

FIG. 1 is a perspective view of essential parts of the hearing aid in which a holder (first holder) is attached to the main body as viewed from the outside. FIG. 2 is a perspective view of the essential parts viewing the hearing aid shown in FIG. 1 from the inside, and FIG. 3 is an exploded perspective view of the hearing aid showing the holder detached from the main body.

In the embodiment described below, top, bottom, left, and right refer to directions shown in FIG. 1. Further, a later-described inner side surface 11 of a main body 1 is to be "one side surface" and an outer side surface 12 is to be an "other side surface" different from the "one side surface".

As shown in FIG. 1 and FIG. 2, a hearing aid 100 according to the present embodiment includes a hearing aid main body (hereinafter, "main body 1") and a holder (hereinafter, "holder 2").

Figure 3:
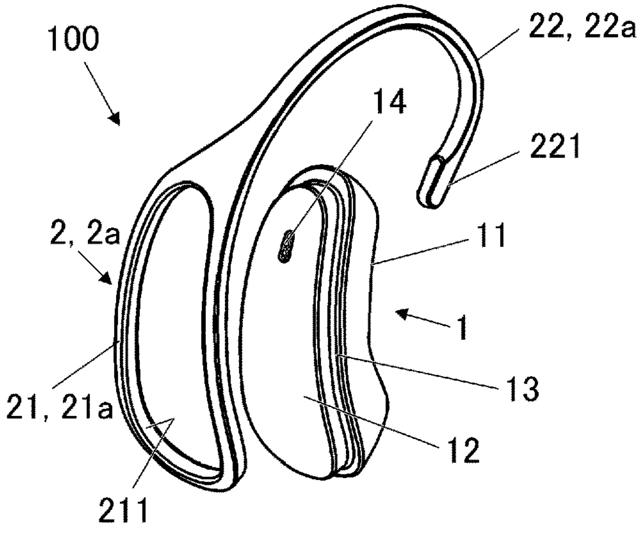
FIG. 3 is an exploded perspective view of the hearing aid showing a state in which a holder is removed from the main body.

As shown in FIG. 3, the holder 2 is detachably provided with respect to the main body 1.

Figure 12:
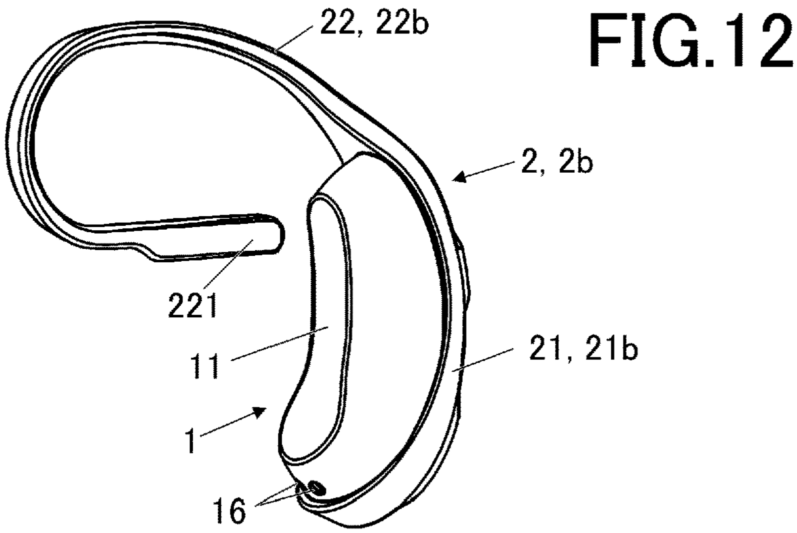
FIG. 12 is a perspective view of essential parts of the hearing aid shown in FIG. 11 as viewed from the lateral side.

According to the hearing aid 100 of the present embodiment, the holder 2 (first holder 2*a*) as shown in FIG. 1, etc., the holder 2 (second holder 2*b*) as shown in FIG. 12, etc., the holder 2 (third holder 2*c*) as shown in FIG. 15, etc., the holder 2 (fourth holder 2*d*) as shown in FIG. 18, etc., are available so as to be able to be attached to and detached from the main body 1. The types of holders 2 that are available are not limited to the four types illustrated in the embodiments. Regarding the holders 2, the types can be less than four types or the shapes other than the examples illustrated here may be available. Hereinafter, when simply referring to the "holder 2", this includes the first holder 2*a*, the second holder 2*b*, the third holder 2*c*, and the fourth holder 2*d*.

The material from which the holder 2 is formed is not limited. However, as described below, according to the present embodiment, it is assumed that the first holder 2*a* and the second holder 2*b* are formed from various resin materials and the third holder 2*c* and the fourth holder 2*d* are formed from various metallic materials.

All of the holders 2 (that is, first holder 2*a*, second holder 2*b*, third holder 2*c*, and fourth holder 2*d*) include a fitting portion 21 that is attached to the main body 1, and an attaching portion 22 that is linked to an ear E when the hearing aid 100 is worn. The fitting portion 21 of the first holder 2*a* is to be the fitting portion 21*a*, the fitting portion 21 of the second holder 2*b* is to be the fitting portion 21*b*, the fitting portion 21 of the third holder 2*c* is to be the fitting portion 21*c*, and the fitting portion 21 of the fourth holder 2*d* is to be the fitting portion 21*d*. All of the above fitting portions 21 are commonly referred when simply described as "fitting portion 21" below. The attaching portion 22 of the first holder 2*a* is to be an attaching portion 22*a*, the attaching portion 22 of the second holder 2*b* is to be an attaching portion 22*b*, the attaching portion 22 of the third holder 2*c* is to be an attaching portion 22*c*, and the attaching portion 22 of the fourth holder 2*d* is to be the attaching portion 22*d*. All of the above attaching portions 22 are commonly referred when simply described as "attaching portion 22" below. According to the present embodiment, the fitting portion 21 and the attaching portion 22 are formed continuously and integrally.

The fitting portion 21 is formed in a ring shape, and the holder 2 is attached to the main body 1 by fitting the fitting portion 21 to a stepped portion 13 provided on an outer side surface 12 of the main body 1.

Here, the configuration of the main body 1 to which the holder 2 is attached is described with reference to FIG. 4, etc.

Figure 4:
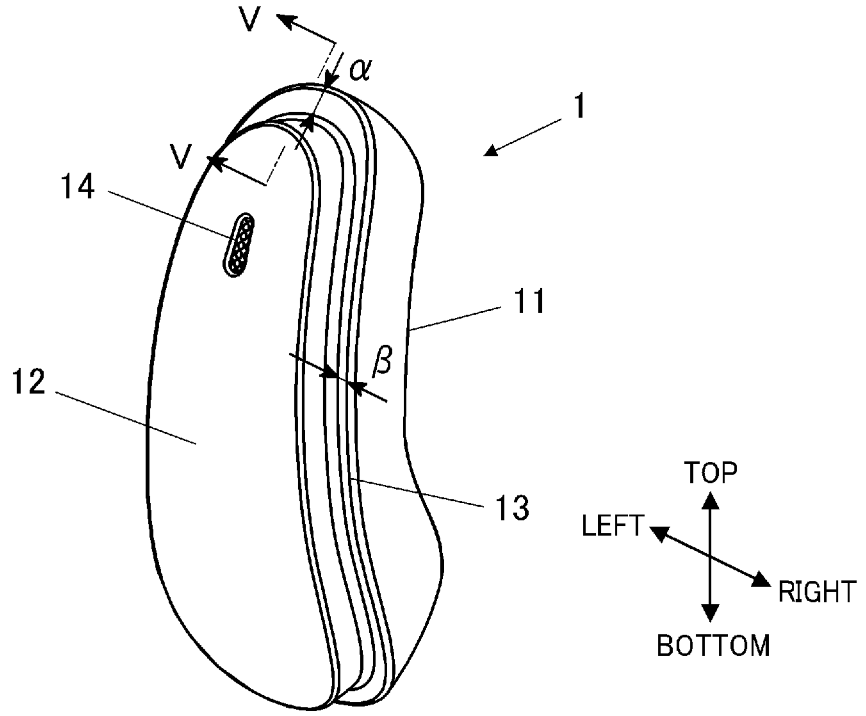
FIG. 4 is a perspective view of the essential parts showing an outer appearance of the main body of the hearing aid.

FIG. 4 is a perspective view showing the outer appearance of the main body. Top, bottom, left, and right shown in FIG. 4 are the same directions as shown in FIG. 1.

Figure 8:
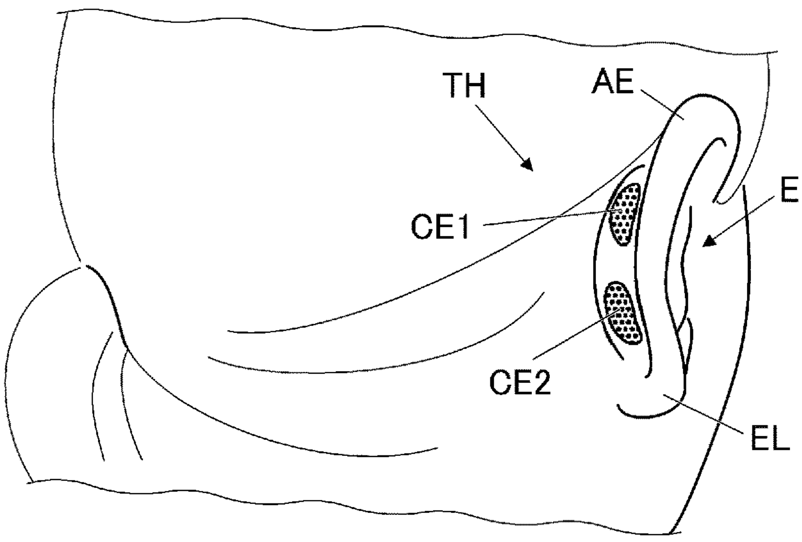
FIG. 8 is an explanatory diagram showing the ear region for describing the position where the hearing aid is worn.

The entire main body 1 is positioned on the rear side of the ear E in a direction so that the inner side surface 11 which is the "one side surface" comes into communication with the ear E when the hearing aid 100 is worn on the ear E (see FIG. 8, etc.).

The stepped portion 13 is provided on an outer peripheral edge of the outer side surface 12 which is the "other side surface" different from one side of the main body 1. The stepped portion 13 is formed along the entire outer peripheral edge of the outer side surface 12.

Figure 5:
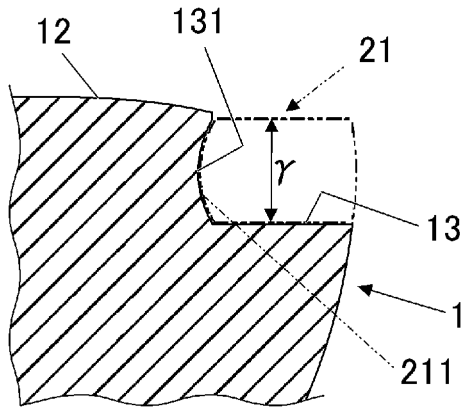
FIG. 5 is a cross-sectional view of the essential parts along line V-V shown in FIG. 4.

FIG. 5 is a cross-sectional view of the essential parts along line V-V shown in FIG. 4 and shows the configuration of the stepped portion. FIG. 5 shows the fitting portion 21 of the holder 2 fitted in the stepped portion 13 with a chain double-dashed line.

As shown in FIG. 5, the stepped portion 13 includes a depth that is substantially equal to a thickness y of the fitting portion 21. The depth of the stepped portion 13 is not limited to the above example. If there is no problem from the viewpoint of design, etc., the depth may be formed to be deeper than the illustrated example. Moreover, it is not preferable to form the depth of the stepped portion 13 of the main body 1 to be shallow because the fitting portion 21 of the holder 2 may be easily detached. However, if the configuration includes various linking structures as described below so that the fitting portion 21 is less likely to be detached, the depth of the stepped portion 13 may be formed to be shallower than the thickness y of the fitting portion 21.

According to the present embodiment, a surface 131 standing from a bottom surface of the stepped portion 13 is recessed in a direction away from the outer peripheral edge. The side corresponding to the surface 131 of the stepped portion 13 in the fitting section 21 of the holder 2 (that is, an inner peripheral surface 211 of the fitting portion 21) is a shape including a bulge along the recess. With this, when the stepped portion 13 is fitted in the fitting portion 21, the fit becomes more secure, and it becomes a linked structure that is less likely to be separated. The surface 131 of the stepped portion 13 and the inner peripheral surface 211 of the fitting portion 21 may each be provided with linking claws and linking recesses in corresponding positions so as to fit each other. With this, it is possible to provide a configuration (linking configuration) that is less likely to be separated by linking the linking claws with the linking recesses.

The shape and the configuration of the stepped portion 13 and the fitting portion 21 are not limited to those illustrated here.

For example, preferably, magnets are provided inside the stepped portion 13 and the fitting portion 21 and the magnets are attracted to each other. In this case, in addition to the stepped portion 13 and the fitting portion 21 fitting with each other according to the shape of the stepped portion 13 and the fitting portion 21, the fitting portion 21 is attached to the stepped portion 13 of the main body 1 by magnetic attractive force. With this, the portions are less likely to be separated. In a case that it is possible to achieve a sufficient hold with only the magnetic attractive force, it is not necessary to provide a linking structure in which the stepped portion 13 fits with the fitting portion 21.

The stepped portion 13 may be formed with a certain width throughout the entire circumference. However, according to the present embodiment, a width α (see FIG. 4) in a position near an edge in a longitudinal direction of the main body 1 (edge at the top or bottom in FIG. 4) is set to be wider than a width β (see FIG. 4) of a portion on both left and right sides of the main body 1. By providing a wide portion in one part or some parts, it becomes more difficult for the holder 2 to be detached from the main body 1 compared to the case in which the width of the stepped portion 13 is a "width β" throughout the entire circumference.

Preferably, the width of parts included on the fitting portion 21 side of the holder 2 is set according to the shape of the stepped portion 13.

In a state in which the holder 2 is attached to the main body 1, as shown in FIG. 2, etc., for example, the fitting portion 21 of the holder 2 is a state supporting the main body 1 from the bottom side so as to hold the main body 1. Therefore, the stepped portion 13 and the fitting portion 21 have a wider width on the lower side of the hearing aid 100 so that it is possible to maintain the main body 1 more stably and to achieve a configuration in which the holder 2 is less likely to be detached.

The main body 1 includes a microphone 14.

The microphone 14 is a sound wave input unit (sound collection unit) that collects sound waves (sound data) from the outside. Sound waves (sound data) collected by the microphone 14 are input to a control apparatus 17 (see FIG. 6), which will be described later.

Although the position of the microphone 14 is not particularly limited, it is preferably a position where external sound waves (sound data) can be easily collected. According to the present embodiment, the microphone 14 is provided near an upper portion on the outer side surface 12 of the main body 1.

Preferably, at least a sound collecting portion of the microphone 14 is exposed to the outside, and the holder 2 is positioned so as not to cover the microphone 14.

That is, the portion where the fitting portion 21 of the holder 2 is fitted with the main body 1 is shaped in a ring. According to the fitting portion 21*a* of the first holder 2*a*, the fitting portion 21*c* of the third holder 2*c*, and the fitting portion 21*d* of the fourth holder 2*d*, the ring shaped fitting portion functions as a "hole" that is formed on an inner side of the fitting portion 21 and that exposes the microphone 14 to the outside. An exterior portion 23 is provided in the fitting portion 21*b* of the second holder 2*b* as described later. A slit 231 formed in the exterior portion 23 functions as the "hole" that exposes the microphone 14 to the outside.

As described above, regardless of the shape of the holder 2 attached to the main body 1, the holder 2 does not cover the microphone 14, and sound collection by the microphone 14 is not hindered.

The main body 1 includes various functional parts stored in a case formed from resin, etc. in order to function as a hearing aid.

Figure 6:
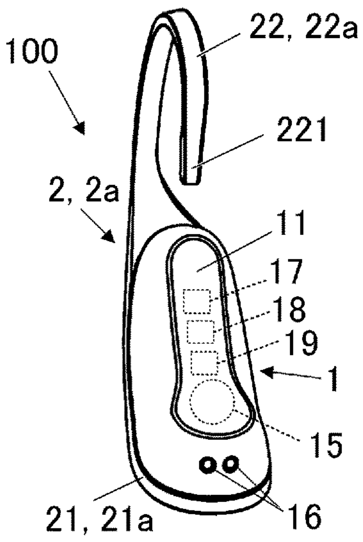
FIG. 6 is an explanatory diagram schematically showing a configuration of essential parts inside the hearing aid in the perspective view of the essential parts of the hearing aid according to the present embodiment viewed from the inner side.

FIG. 6 is a perspective view of the hearing aid viewed from the inside and schematically shows the main functional portions provided in the apparatus.

As shown in FIG. 6, the hearing aid 100 includes the control apparatus 17, a storage apparatus 18, a power source 19, an oscillator 15, and the like.

The control apparatus 17 includes an IC (Integrated Circuit), and LSI (Large Scale Integration), etc. and is a computer that controls each section of the hearing aid 100.

The storage apparatus 18 stores various programs, data, etc. necessary for the control apparatus 17 to implement various functions.

The power supply 19 is an internal battery, etc. that supplies electric power to each section of the hearing aid 100. As shown in FIG. 6, etc., a charging terminal 16 is provided in the main body 1. The battery, etc. of the power supply 19 can be charged by connecting the charging terminal 16 to various external power supplies. The position of the charging terminal is not limited. According to the present embodiment, as shown in FIG. 6, etc., the charging terminal is provided near a lower edge of the main body 1 (lower edge in FIG. 1, FIG. 4, etc.). The connection with the external power supply may be in a contact or non-contact manner. In a case that it is possible to charge in a non-contact manner, the charging terminal does not have to be exposed on the lateral side, etc. of the main body as illustrated in the examples.

According to the present embodiment, for example, when the hearing aid 100 is stored in a dedicated case (not shown), the charging terminal is connected to the external power supply and the charging can be performed.

The oscillator 15 transmits the sound waves (sound data) collected by the microphone 14 to a bone of the ear including cartilage as vibrations.

The oscillator 15 is positioned on the inner side of the inner side surface 11 on the lower side of the main body 1.

As shown in FIG. 4, etc. the width of the main body 1 of the present embodiment in the left-right direction is slightly wider toward the lower side than the upper side and the shape is plump and round as a whole. The main body 1 includes a curve in an arch in the up-down direction, and the inner side surface 11 is positioned naturally along the skin on the rear of the ear when the main body 1 is positioned behind the ear E.

Preferably, the oscillator 15 is positioned to come into contact near the bone of the ear E including the cartilage when the hearing aid 100 is worn on the ear E.

Figure 7:
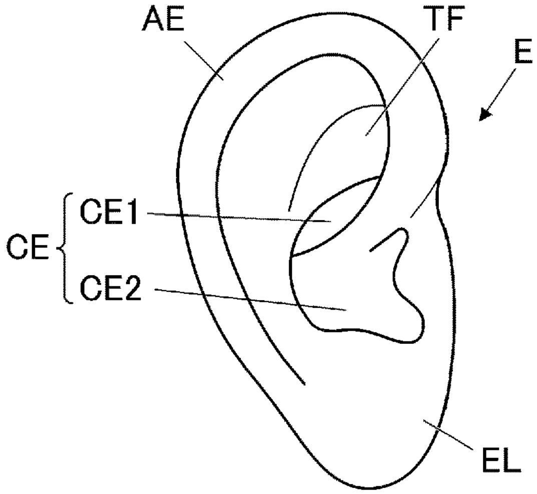
FIG. 7 is an explanatory diagram showing an ear region for describing the position where the hearing aid is worn.

FIG. 7 and FIG. 8 are explanatory diagrams showing the configuration of a typical ear.

The ear E is formed of a cartilage in a portion from an auricle AE of an external ear exposed to the outside to an external auditory canal. The vibrations are easily transmitted from a "concha CE" (refer to FIG. 7, etc.) including "cymba concha CE1" and "cavum concha CE2" near an entrance of the external auditory canal. FIG. 8 is shown with hatching in a position corresponding to the "cymba concha CE1" and "cavum concha CE2" in a case that a head of a person is viewed from behind diagonally.

When the hearing aid 100 according to the present embodiment is worn on the ear E, the main body 1 is fitted between the auricle AE and the head (temporal portion TH in FIG. 8, etc.) (see FIG. 10). Then, as shown in FIG. 9, the inner side surface 11 of the main body 1 when worn on the ear E comes into contact with the rear side of the ear E from the lower side.

According to the present embodiment, the main body 1 does not have to be positioned in the upper part of the auricle AE. The main body 1 needs to be positioned so as to be at least in the lower part of the auricle AE near the ear canal (position corresponding to "cavum concha CE2" in FIG. 8).

Figure 9:
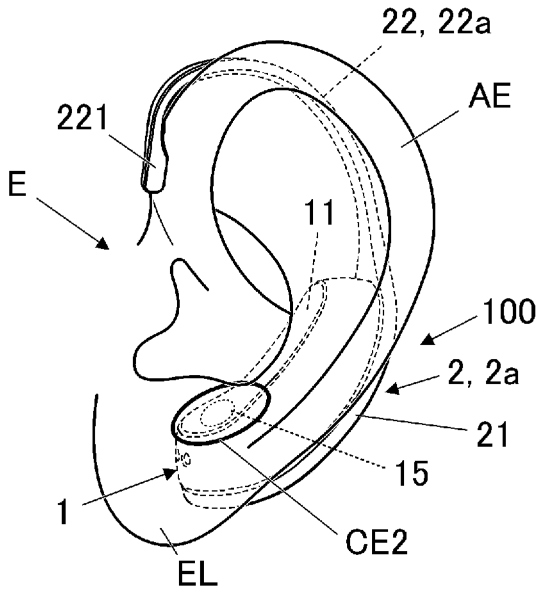
FIG. 9 is an explanatory diagram for describing a position where the hearing aid according to the present embodiment is worn.

In a state in which the main body 1 is in contact with the rear side of the ear E, it is preferable that the oscillator 15 is positioned in a position corresponding to the "concha CE" shown in FIG. 8 and FIG. 9 (specifically the lower side which is the "cavum concha CE2") (see FIG. 9).

With this, it becomes easy for the oscillator 15 to transmit the sound wave (sound data) as the vibrations to the bone (cartilage).

Figure 10:
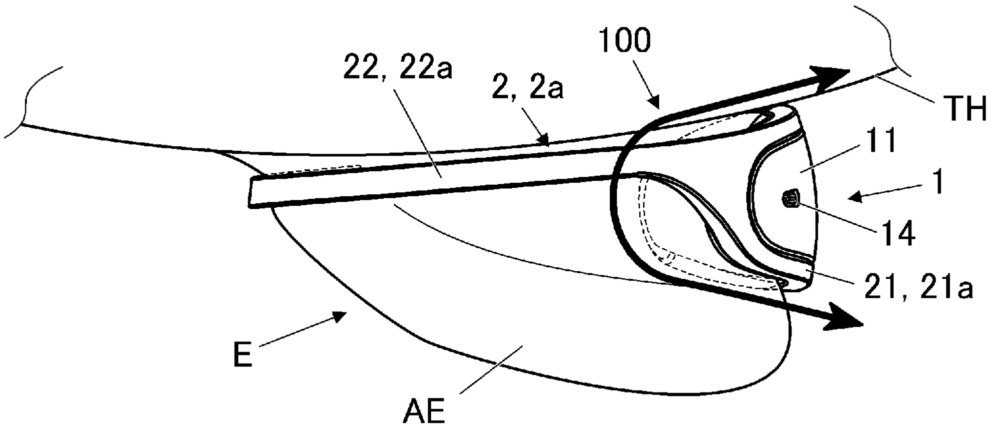
FIG. 10 is a perspective view of essential parts viewed from above in a state in which the hearing aid according to the present embodiment is worn on the ear.

As shown in FIG. 10, in a case in which the hearing aid 100 of the present embodiment worn on the ear E is viewed from above (crown side), the hearing aid 100 (at least the main body 1) positioned between the auricle AE and the temporal portion TH is in a substantial trapezoidal shape viewed from above.

The short side of the trapezoid (that is, the side of the inner side surface 11) is positioned on a root side of the ear E, and the width gradually becomes wider toward the long side of the trapezoid (that is, the side of the outer side surface 12). With this, the hearing aid 100 (at least the main body 1) is fitted in a space between the auricle AE and the temporal portion TH with almost no gap. Therefore, a state in which it is difficult to fall and to rattle is maintained.

Further, the hearing aid 100 is worn on the ear E so that the holder 2 supports the entire main body 1 from below. Therefore, the inner side surface 11 of the man body 1 (specifically, the lower side portion in which the oscillator 15 is positioned inside) easily fits to the rear side of the ear E.

In a case in which the first holder 2*a* is attached to the main body, as shown in FIG. 9 and FIG. 10, the attaching portion 22*a* of the first holder 2*a* is hooked to the auricle AE from the upper side of the ear E, and a tip 221 of the attaching portion 22*a* circles around to the front side of the ear E. In a case in which the first holder 2*a* is formed from a resin with a certain degree of elasticity and flexibility such as elastomer, the main body 1 is pulled upward by the holder 2, and the main body 1 easily fits to the rear side of the ear E even more.

The side of the first holder 2*a* positioned to the skull side (temporal portion TH side) is in a straight shape as shown in FIG. 10, etc. Therefore, the first holder 2*a* and the main body 1 with the first holder 2*a* attached are positioned along the temporal portion TH. With this, the first holder 2*a* and the main body 1 are less likely to be lifted from the head and the position is stabilized.

Figure 11:
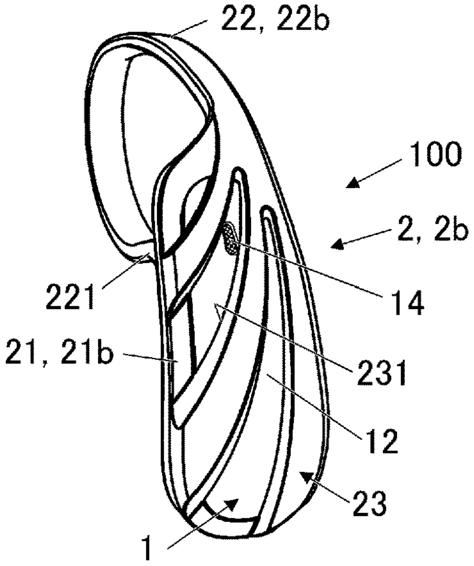
FIG. 11 is a perspective view of essential parts of the hearing aid in which a second holder is attached to the main body as viewed from the outside.

FIG. 11 is a perspective view of essential parts of the hearing aid showing a state in which the second holder is attached to the main body. FIG. 12 is a perspective view of essential parts of the hearing aid showing a state in which the second holder is attached to the main body viewed from the side.

The second holder 2*b* shown in FIG. 12, etc. has a more gorgeous design than the first holder 2*a*, and is a holder 2 assuming aggressive activities such as sports and various leisure activities.

Similar to the first holder 2*a*, the second holder 2*b* is formed from resin with a certain degree of elasticity and flexibility such as elastomer. The second holder 2*b* is assumed to be relatively colorful such as having a fluorescent color. Moreover, the color may include fluorescent material so that the color stands out even in dark places.

In the second holder 2*b*, it is preferable that the exterior portion 23 is provided from above the fitting portion 21*b* fitted in the stepped portion 13 of the main body 1. The exterior portion 23 is provided throughout the entire fitting portion 21*b*, and the exterior portion 23 wraps around the outer side surface 12 of the main body 1.

A slit 231 is suitably provided in the exterior portion 23, and a microphone 14 is exposed from the slit 231. With this, the collection of the sound by the microphone 14 is not hindered even when the exterior portion 23 is provided.

The shape of the exterior portion 23 is not limited to the illustrated examples, and may be a spiral pattern or a horizontal striped pattern. However, regardless of the design, it is preferable that the holder 2 (second holder 2*b*) is positioned so as not to cover the microphone 14 provided in the outer side surface 12.

Figure 13:
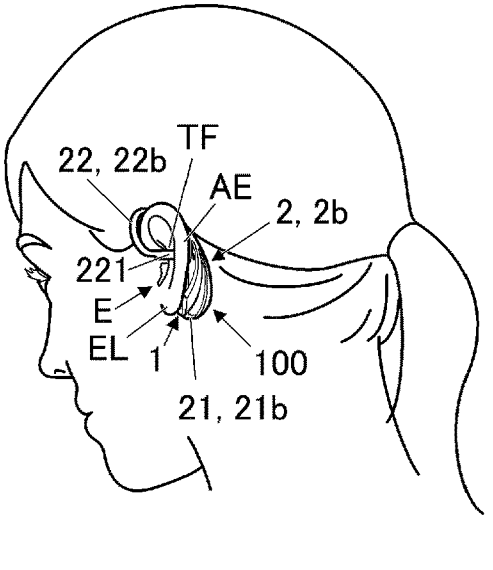
FIG. 13 is a perspective view of the essential parts viewed from the rear diagonally in a state in which the hearing aid shown in FIG. 11 is worn on the ear.

As shown in FIG. 12, the attaching portion 22*b* in the second holder 2*b* is formed in a substantial U shape. Then, as shown in FIG. 13, the tip 221 of the attaching portion 22*b* is inserted in the triangular fossa (see FIG. 13 and FIG. 7) of the ear E, and is linked. Therefore, even if a vibration is applied at a certain degree such as during sports, etc., the hearing aid 100 does not easily fall or become shifted. With this, the user is able to forget the presence of the hearing aid 100 and enjoy the experience.

Preferably, the attaching portion 22*b* (specifically, the tip 221) is formed from a soft material. For example, a cap, etc. formed from silicone, etc. may cover only the tip of the attaching portion 22*b* and this may be the tip 221. With this, even if the tip 221 is inserted in the triangular fossa TF (see FIG. 13) when the hearing aid 100 is worn, this does not cause pain and does not become a burden to the user.

The second holder 2*b* includes an attaching portion 22*b* greatly projecting toward the inner side of the hearing aid 100 as shown in FIG. 12, and an exterior portion 23 that wraps around the outer side surface 12 of the main body 1. Therefore, the second holder 2*b* is arranged so as to surround the outer side of the main body 1. Therefore, even if the hearing aid 100 separates and falls from the ear E, it is possible to absorb the impact from falling to some extent by the holder 2 (second holder 2*b*) formed from elastomer. Therefore, it is possible to avoid a large impact from being directly applied to the main body 1, and the main body 1 is less likely to be damaged. Further, by forming the holder 2 (second holder 2*b*) with elastomer, etc., the holder 2 itself is less likely to be broken from the impact.

Figure 14A:
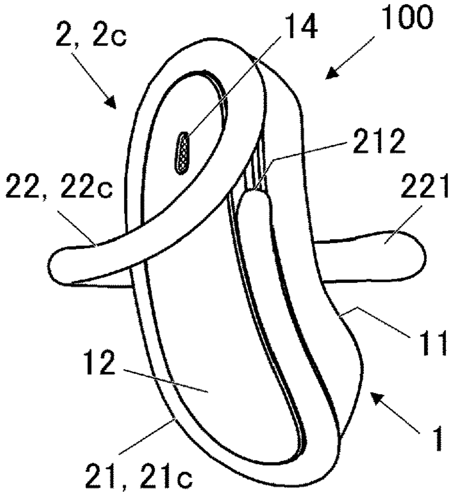
FIG. 14A and FIG. 14B are perspective views of the essential parts viewing from the outside the hearing aid showing the state in which the third holder is attached to the main body, specifically.
Figure 14B:
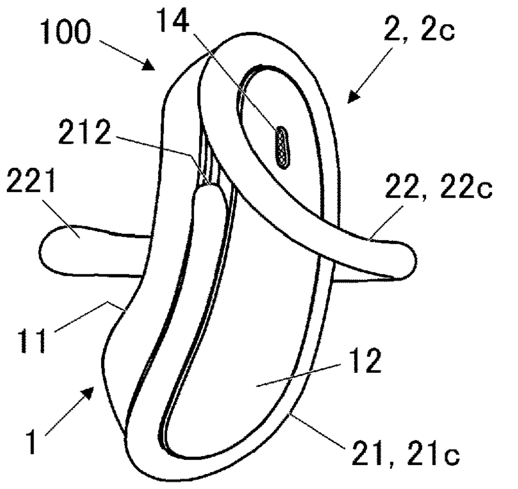

FIG. 14A and FIG. 14B are perspective views of the essential parts the hearing aid showing the state in which the third holder is attached to the main body, specifically, FIG. 14A is the hearing aid for the left ear, and FIG. 14B is the hearing aid for the right ear.

Figure 15A:
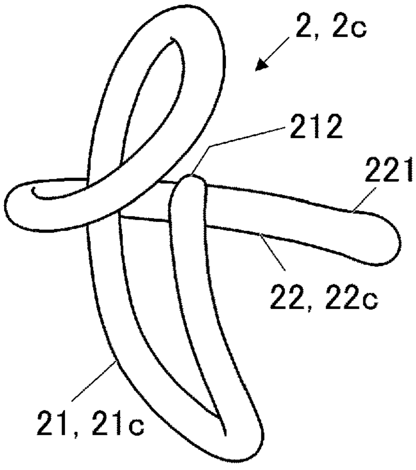
FIG. 15A and FIG. 15B are perspective views of the essential parts of the third holder, specifically.
Figure 15B:
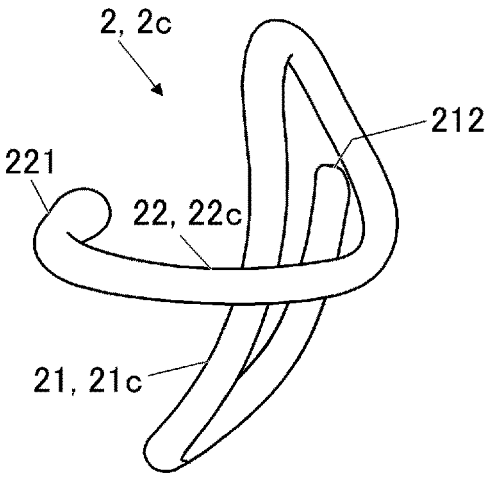

FIG. 15A and FIG. 15B are perspective views of the essential parts of the third holder, specifically, FIG. 15A is a perspective view of the third holder showing a state in which only the holder is detached from the state shown in FIG. 14A, and FIG. 15B is a perspective view showing the third holder shown in FIG. 15A in a direction in which the attaching portion is positioned to the closer area.

The third holder 2*c* shown in FIG. 14A and FIG. 14B is the holder 2 with a luxurious and calm design suitable for fashionable occasions such as parties. According to the hearing aid 100 with the third holder 2*c* attached, the hearing aid 100 can be worn like an accessory. The third holder 2*c* is designed so that women feel less resistance toward wearing the hearing aid 100.

The third holder 2*c* is formed of metal, etc. Preferably, metals that are used in typical accessories and that are relatively less likely to cause metal allergies are used as the metal for the third holder 2*c*. Examples of the metal used for the third holder 2*c* include, gold, platinum, titanium, and the like.

Preferably, in the third holder 2*c*, a gap 212 is provided to a portion of the fitting portion 21*c* fitted in the stepped portion 13 of the main body 1. By providing a gap 212 in a portion instead of forming the fitting portion 21*c* in a continuous ring shape without cuts, the fitting portion 21*c* slightly expands in the gap 212 when the fitting portion 21*c* is fitted in the stepped portion 13. Therefore, the fitting portion 21*c* can be relatively smoothly fit without force. Moreover, it becomes relatively easy to remove the fitting portion 21*c* from the main body 1.

As shown in FIG. 14A and FIG. 14B, the third holder 2*c* is positioned so that the holder 2 (third holder 2*c*) surrounds the outer side of the main body 1 from the outer side surface 12 side to the inner side surface 11 side of the main body 1. Therefore, even if the hearing aid 100 separates and falls from the ear E, since the holder 2 (third holder 2*c*) first hits the ground, etc., it is possible to absorb the impact from falling to some extent. With this, it is possible to avoid a large impact from being directly applied to the main body 1, and the main body 1 is less likely to be damaged.

Figure 16:
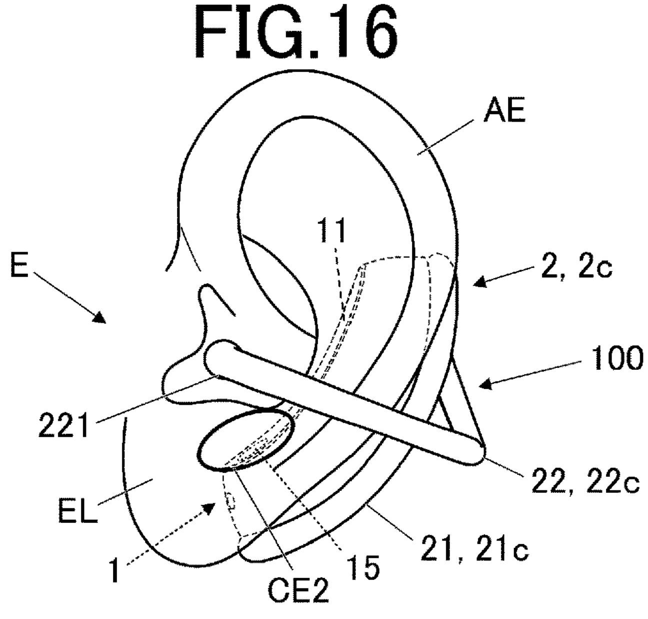
FIG. 16 is a diagram showing a state in which the hearing aid with the third holder attached to the main body is worn on the ear.

FIG. 16 is a diagram showing a state in which the hearing aid with the third holder attached to the main body is worn on the ear.

As shown in FIG. 16, in the third holder 2*c*, the attaching portion 22*c* connected to the fitting portion 21*c* fitted in the main body 1 positioned behind the ear E passes the side of the ear E and goes around to the front side of the ear E. The tip 221 of the attaching portion 22*c* may be hooked to an ear canal, etc.

The main body 1 is positioned in the predetermined position by sandwiching the ear E (for example, auricle AE, earlobe EL, etc.) with the main body 1 and at least a portion of the third holder 2*c* (that is, attaching portion 22*c* of the third holder 2*c*).

The predetermined position is the position where the main body 1 is placed so that the oscillator 15 is in a position corresponding to the "concha CE" (specifically the lower side which is the "cavum concha CE2") as shown in FIG. 16 in a state in which the main body 1 is in contact with the rear side of the ear E.

FIG. 17 is a perspective view of essential parts of the hearing aid in which a fourth holder is attached to the main body.

FIG. 18A and FIG. 18B are perspective views of the essential parts of the fourth holder, specifically, FIG. 18A is a perspective view showing only the fourth holder being detached from the state shown in FIG. 17, and FIG. 18B is a diagram viewing from the inner side the state of attachment of the fourth holder shown in FIG. 18A attached to the main body.

The fourth holder 2*d* shown in FIG. 18A and FIG. 18B is a holder 2 with a relatively simple design. As shown in FIG. 17, the hearing aid 100 with the fourth holder 2*d* attached is a design that is easy for a man to wear with little resistance.

Similar to the third holder 2*c*, the fourth holder 2*d* is formed from metal such as gold, platinum, titanium, and the like.

Regarding the fourth holder 2*d* also, similar to the third holder 2*c*, it is possible to employ a configuration in which a space is provided in a portion of the fitting portion 21*d* so as to easily fit the fitting portion 21*d* (easily detach).

Similar to the third holder 2*c*, the fourth holder 2*d* is positioned so that the holder 2 (fourth holder 2*d*) surrounds the outer side of the main body 1 from the outer side surface 12 side to the inner side surface 11 side of the main body 1. Therefore, even if the hearing aid 100 separates and falls from the ear E, since the holder 2 (fourth holder 2*d*) first hits the ground, etc., it is possible to absorb the impact from falling to some extent. With this, it is possible to prevent a large impact being directly applied to the main body 1. Consequently, the main body 1 is less likely to be damaged.

FIG. 19 is a diagram showing a state in which the hearing aid with the fourth holder attached to the main body is worn on the ear.

As shown in FIG. 19, in the fourth holder 2*d*, the attaching portion 22*d* connected to the fitting portion 21*d* fitted in the main body 1 positioned behind the ear E passes the side of the ear E and goes around to the front side of the ear E. The tip 221 of the attaching portion 22*d* may be hooked to an ear canal, etc.

The main body 1 is positioned in the predetermined position by sandwiching the ear E (for example, auricle AE, earlobe EL, etc.) with the main body 1 and at least a portion of the fourth holder 2*d* (that is, attaching portion 22*d* of the fourth holder 2*d*).

The predetermined position is similar to that described for the hearing aid 100 with the third holder 2*c* attached, and therefore, the description is omitted.

Next, operation of the hearing aid 100 according to the present embodiment is described.

First, in a normal situation (that is, in everyday life), the first holder 2*a* is attached to the main body 1.

The holder 2 is shaped in a straight line shape on the side where the attaching portion 22 is positioned on the side of the skull. The shape of the holder 2 is different between the left and the right, but the main body 1 is the same shape between the left and the right.

The functional section as the hearing aid mounted to the main body 1 can be set and customized by the user. In this case, due to the difference in hearing ability between the left and the right ears, the setting may be different between the left and right hearing aids. In such case, the fitting portion 21*a* of the first holder 2*a* is fit in the stepped portion 13 of the main body 1 so that the holder 2 for the left matches with the main body 1 for the left, and the same can be said for the right.

Specifically, in a case in which the first holder 2*a* is formed from elastomer, etc., for example, a corresponding portion of the fitting portion 21*a* is hooked to a wide portion of the stepped portion 13 (for example, an upper end or lower end of the main body 1). The fitting portion 21*a* is widened a little while the stepped portion 13 is fitted. With this, the fitting portion 21*a* is attached to the stepped portion 13 in a state under tension. In a situation in which the degree of the first holder 2*a* becoming difficult to be separated is enhanced by the attractive force of the magnet, the first holder 2*a* is also held by the magnet.

As shown in FIG. 9 and FIG. 10, for example, the main body 1 is positioned on the rear side of the ear E so that the inner side surface 11 of the main body 1 comes into contact with the skin of the ear E. The attaching portion 22*a* of the first holder 2*a* is hooked from the upper side of the ear E and is engaged with the ear E. Here, the position of the main body 1 is adjusted so that the portion where the oscillator 15 is provided comes into contact with the area near the bone of the ear E including the cartilage (for example, the position corresponding to the cavum concha CE2). With this, the sound waves (sound data) collected by the microphone 14 is transmitted to the bone (cartilage) as the vibrations and it is possible to hear sounds well.

In a situation in which the user participates in aggressive activities such as sports, the second holder 2*b* is attached to the main body 1.

The second holder 2*b* is also shaped in a straight line shape on the side where the attaching portion 22*b* is positioned on the side of the skull. The shape of the second holder 2*b* is different between the left and the right, and the fitting portion 21*b* of each of the left and the right device is fitted to the stepped portion 13 of the main body 1. In a situation in which the fitting portion 21*b* is attached to the main body 1, the attaching position of the second holder 2*b* is adjusted so that the microphone is exposed from the slit portion 231 of the exterior portion 23. The specific method of attaching the second holder **2*b* is similar to the first holder 2*a***, and therefore the description is omitted.

As shown in FIG. 13, the main body 1 is positioned on the rear side of the ear E so that the inner side surface 11 of the main body 1 comes into contact with the skin of the ear E. The second holder **2*b* is hooked from the upper side of the ear E and is engaged with the ear E. With the second holder 2*b*, the attaching portion 22*b* circles largely around to the front side of the ear E and the tip 221** is in a state inserted into the triangular fossa TF.

Similar to the first holder **2*a*, the position of the main body 1 is adjusted so that the portion where the oscillator 15 is provided comes into contact with the area near the bone of the ear E including the cartilage (for example, the position corresponding to the cavum concha CE2**).

With this, the sound waves (sound data) collected by the microphone 14 is transmitted to the bone (cartilage) as the vibrations and it is possible to hear sounds well. With the second holder **2*b*, the attaching portion 22*b* deeply surrounds the ear E and the stationary position is maintained. Therefore, even if the user moves drastically during sports, etc., the hearing aid 100 is less likely to fall off. Further, since the second holder 2*b* is positioned so as to surround the outer side of the main body 1, even if the hearing aid 100 falls, the impact on the main body 1** in which the functional portions are stored can be suppressed to a minimum.

In a situation in which the user desires to enjoy the hearing aid fashionably, the third holder **2*c* or the fourth holder 2*d* is attached to the main body 1**.

The third holder **2*c* and the fourth holder 2*d*** are formed from various metals, etc., and it is possible to enjoy a luxurious and fashionable outer appearance.

In the third holder **2*c* and the fourth holder 2*d* also, the shapes are different for the left and the right ear, and each fitting portion 21*b* is fitted in the respective stepped portion 13 of the main body 1. In a situation in which the third holder 2*c* and the fourth holder 2*d* are attached to the main body 1 also, the third holder 2*c* and the fourth holder 2*d* are positioned so that the microphone 14 is not covered by the attaching portions 22*c* and 22*d***.

As shown in FIG. 16 and FIG. 19, the main body 1 is positioned on the rear side of the ear E so that the inner side surface 11 comes into contact with the skin of the ear E. The third holder **2*c* and the fourth holder 2*d* are hooked to the side of the ear E and the ear E (for example, auricle AE, the ear lobe EL, etc.) is sandwiched between the main body 1 and the holder 2 (third holder 2*c* and fourth holder 2*d*). With this, the main body 1** is positioned in the predetermined position.

With this, the sound waves (sound data) collected by the microphone 14 is transmitted to the bone (cartilage) as the vibrations and it is possible to hear sounds well. As shown in FIG. 14A and FIG. 17, the third holder **2*c* and the fourth holder 2*d* are positioned so as to surround the outer side of the main body 1. Therefore, even if the hearing aid 100 falls, the impact on the main body 1** in which the functional portions as the hearing aid are stored can be suppressed to a minimum.

As described above, by exchanging the holder 2 depending on the situation that the hearing aid 100 is worn, the user is able to wear the hearing aid 100 with the outer appearance suitable for the situation without owning a plurality of types of hearing aids.

As described above, the hearing aid 100 according to the present embodiment includes, the main body 1 in which the inner side surface 11 which is "one side surface" comes into contact with the ear E when the hearing aid 100 is worn, and the holder 2 provided detachably to the main body 1. The main body 1 is provided with the stepped portion 13 on the outer peripheral edge of the outer side surface 12 which is the "other side surface" different from "one side" in contact with the ear E. The holder 2 includes the fitting portion 21 fitted to the stepped portion 13 and the attaching portion 22 attached to the ear E.

With this, it is possible to easily attach the holder 2 by fitting the fitting portion 21 in the stepped portion 13 of the main body 1. Since the holder 2 can be easily attached and detached by fitting and removing the ring-shaped fitting portion 21 in the stepped portion 13, it is possible to attach to the main body 1 the preferred holder 2 according to the purpose and situation that the hearing aid 100 is worn. Consequently, it is possible to easily change the outer appearance of the hearing aid 100.

The main body 1 includes a microphone 14 that collects external sounds, and the holder 2 attached to the main body 1 is positioned so as not to cover the microphone 14.

When the microphone 14 is covered, it becomes difficult to collect the external sounds. By not covering the microphone 14, it is possible to suitably collect sound. This is important for the hearing aid to function suitably.

The main body 1 may include the oscillator 15, and the oscillator 15 may be positioned so as to come into contact with an area near the bone of the ear E including the cartilage when the hearing aid is worn.

According to a configuration that transmits sound by bone conduction (or cartilage conduction) using the oscillator 15, it is possible to hear sound without putting a receiver (speaker), etc. in the ear canal. Therefore, it becomes possible to position the hearing aid 100 including the main body 1 on the rear side of the ear E when the hearing aid 100 is worn, and the hearing aid 100 does not stand out even if it is worn.

In the hearing aid 100 according to the present embodiment, the main body 1 is formed in a trapezoidal shape viewed from above in a worn state. The hearing aid 100 is positioned so that the short end side of the trapezoid is positioned toward the root side of the ear E.

Therefore, the main body 1 of the hearing aid 100 stably fits in the gap between the ear E and the skull (temporal portion TH). Consequently, the worn hearing aid 100 does not stand out, and since the hearing aid 100 fits in the gap behind the ear E, the positions of the main body 1 is less likely to move.

Moreover, for example, as in the second holder **2*b* shown in FIG. 11, the third holder 2*c* shown in FIG. 14A, and the fourth holder 2*d* shown in FIG. 17, when the holder 2 is positioned so as to surround the outer side of the main body 1, even if the hearing aid 100 falls off of the ear E, the holder 2** is able to absorb the impact to a certain extent.

Therefore, it is possible to protect the main body 1 including the functional portions of the hearing aid from the impact and to prevent damage.

For example, as in the third holder **2*c* shown in FIG. 14A and the fourth holder 2*d* as shown in FIG. 17, in a case in which the main body 1 is positioned in the predetermined position by sandwiching the ear E between at least a portion of the holder 2 (specifically, the attaching portions 22*c*, 22*d*) and the main body 1, it is possible to show the hearing aid 100 as an accessory worn on the ear E, and the resistance toward wearing the hearing aid 100** may decrease.

The main body 1 as the hearing aid main body includes the stepped portion 13 on the outer peripheral edge of the outer side surface 12 which is the "other side surface" different from the inner side surface 11 which is the "one side surface" in contact with the ear E when the hearing aid is worn. The main body 1 can be attached to and detached from the holder 2 (holding member) including the fitting portion 21 fitted in the stepped portion 13.

With this, the holder 2 attached to the main body 1 can be exchanged, and the preferable holder 2 can be attached to the main body 1 according to the purpose and situation that the hearing aid 100 is worn. With this, the outer appearance of the hearing aid 100 can be easily changed.

The holder 2 as the holding member includes a fitting portion 21. The fitting portion 21 can be fitted to be attached to and detached from the stepped portion 13 in the main body 1 (hearing aid main body) including the stepped portion 13 provided on the outer peripheral edge of the outer side surface 12 which is the "other side surface" different from the inner side surface 11 which is the "one side surface" in contact with the ear E when the hearing aid is worn and the microphone 14 which is the sound collector that collects sound from the outside. The hole that exposes the microphone 14 to the outside is included on the inner side of the fitting portion 21.

With this, the holder 2 attached to the main body 1 can be exchanged, and the microphone 14 is not covered regardless of which holder 2 is attached. Therefore, the sound collecting operation which is important for the function of the hearing aid can be suitably performed.

Various embodiments of the present invention are described above but the present invention is not limited to the above embodiments, and various modifications are possible without leaving the scope of the present disclosure.

According to the present embodiment, the main body 1 is placed in the "predetermined position" so that the oscillator 15 is in a position corresponding to the "concha CE" (specifically the lower side which is the "cavum concha CE2") as shown in FIG. 9 in a state in which the main body 1 is in contact with the rear side of the ear E, but the position of the main body 1 is not limited to the above. The main body 1 is to be positioned so that the oscillator 15 is in contact with the area near the bone of the ear E including the cartilage when the hearing aid 100 is worn, and the position of the ear E where the position of the oscillator 15 corresponds to is suitably set.

Further, the position of the microphone 14 and the position of the oscillator 15 in the main body 1 are not limited to the examples described in the embodiment.

The position can be set to any position that does not disturb the sound collecting function of the microphone 14 and the sound transmitting function of the oscillator 15.

According to the present embodiment, the first holder 2*a* and the second holder 2*b* are formed from resin such as elastomer and the third holder 2*c* and the fourth holder 2*d* are formed from metal such as gold or platinum. However, the material with which the holder 2 is formed is not limited to the above examples.

For example, the first holder 2*a* and the second holder 2*b* can be formed from metal and the third holder 2*c* and the fourth holder 2*d* can be formed from resin.

The shape of the main body 1 and the holder 2 can be suitably changed. The shape of the main body 1 and the holder 2 may be customized according to the shape of the user's ear E and its surrounding area.

Although some embodiments of the present invention have been described above, the scope of the present disclosure is not limited to the embodiments described above, but includes the scope of the invention described in the claims and their equivalents.

The invention claimed is:

1. A hearing aid comprising:
a main body including a battery;
a surface of one side of the main body being in contact with a lower side of a back of an ear corresponding to a cavum concha when the hearing aid is worn; and
a holding portion that supports the main body from the lower side when the hearing aid is worn, the holding portion being detachable from the main body;
wherein,
the main body is provided with a stepped portion on an outer peripheral edge of an other side surface different from the one side surface in contact with the ear, and
the holder includes a fitting portion fitted in the stepped portion and an attaching portion that is formed continuously and integrally with the fitting portion, the attachment portion being attached to the ear when the hearing aid is worn.

2. The hearing aid according to claim 1, wherein,
the main body includes a microphone, and
when the holder is attached to the main body, the holder is positioned so as not to cover the microphone.

3. The hearing aid according to claim 2, wherein,
an exterior portion is provided on the fitting portion,
at least one slit is provided in the exterior portion, and
the slit is positioned in a position that does not cover the microphone.

4. The hearing aid according to claim 2, wherein,
a gap is provided in a part of the fitting portion, and
the attaching portion is positioned in a position that does not cover the microphone.

5. The hearing aid according to claim 2, wherein the microphone is provided on the other side surface different from the one side surface in contact with the ear.

6. The hearing aid according to claim 1, wherein,
the main body includes an oscillator, and
the oscillator is positioned in a position so as to come into contact with an area near a bone of the ear including a cartilage when worn.

7. The hearing aid according to claim 1, wherein the main body is positioned on a rear side of the ear when worn.

8. The hearing aid according to claim 7, wherein the main body is formed in a trapezoidal shape viewed from above when worn and the main body is positioned on a root side of the ear on a short end side of the trapezoid.

9. The hearing aid according to claim 1, wherein a width of the main body near an end in a longitudinal direction is set to be wider than a width of a portion on both left and right sides of the main body.

10. The hearing aid according to claim 1, wherein when the holder is attached to the main body, the holder is positioned so as to surround an outer side of the main body.

11. The hearing aid according to claim 1, wherein when the holder is attached to the main body, the main body is positioned in a predetermined position by sandwiching the ear between at least a part of the holder and the main body.

12. The hearing aid according to claim 1, wherein when the holder is attached to the main body, the holder is positioned to surround an outer side of the main body from an outer side surface to an inner side surface of the main body.

13. The hearing aid according to claim 1, wherein the stepped portion is a depth substantially the same as a thickness of the fitting portion.

14. The hearing aid according to claim 1, wherein,
an oscillator is provided at a bottom of the one side surface, and
a microphone is provided at a top of the other side surface.

15. The hearing aid according to claim 1, wherein a hole to expose a sound collector provided in the hearing aid to the outside is included on an inner side of the fitting portion.

* * * * *